(12) United States Patent
Agiwal

(10) Patent No.: US 9,749,112 B2
(45) Date of Patent: Aug. 29, 2017

(54) METHOD AND SYSTEM SWITCHING AND SYNCHRONIZING GRANT INTERVALS IN ADAPTIVE GRANT AND POLLING SERVICE

(71) Applicant: Samsung Electronics Co. Ltd., Suwon-si, Gyeonggi-do (KR)

(72) Inventor: Anil Agiwal, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 13 days.

(21) Appl. No.: 13/957,828

(22) Filed: Aug. 2, 2013

(65) Prior Publication Data

US 2014/0086165 A1 Mar. 27, 2014

(30) Foreign Application Priority Data

Sep. 24, 2012 (IN) .......................... 3964/CHE/2012

(51) Int. Cl.
| | |
|---|---|
| H04L 5/00 | (2006.01) |
| H04W 28/18 | (2009.01) |
| H04W 28/06 | (2009.01) |
| H04W 28/12 | (2009.01) |
| H04W 72/04 | (2009.01) |
| H04W 72/12 | (2009.01) |
| H04W 28/24 | (2009.01) |

(52) U.S. Cl.
CPC ........... *H04L 5/0064* (2013.01); *H04W 28/18* (2013.01); *H04W 28/06* (2013.01); *H04W 28/24* (2013.01); *H04W 72/04* (2013.01); *H04W 72/12* (2013.01)

(58) Field of Classification Search
None
See application file for complete search history.

(56) References Cited

U.S. PATENT DOCUMENTS

| | | | |
|---|---|---|---|
| 2005/0243761 A1* | 11/2005 | Terry et al. | 370/328 |
| 2007/0076856 A1* | 4/2007 | Gummalla et al. | 379/88.17 |
| 2008/0130670 A1* | 6/2008 | Kim et al. | 370/412 |
| 2009/0116420 A1* | 5/2009 | Jeong | H04B 7/2606 370/312 |
| 2010/0008242 A1 | 1/2010 | Schein | |
| 2010/0220673 A1* | 9/2010 | Hui et al. | 370/329 |
| 2011/0164587 A1* | 7/2011 | Seo | 370/329 |
| 2011/0194538 A1* | 8/2011 | Zheng et al. | 370/335 |
| 2011/0317638 A1* | 12/2011 | Cho et al. | 370/329 |
| 2012/0113949 A1* | 5/2012 | Kim et al. | 370/329 |

* cited by examiner

*Primary Examiner* — Hicham Foud
(74) *Attorney, Agent, or Firm* — Jefferson IP Law, LLP

(57) ABSTRACT

An apparatus and a method for switching and synchronizing parameters of an adaptive granting and polling service in a wireless network are provided. The method includes determining a switching of parameter sets from a primary Quality of Service (QoS) parameter set to a secondary QoS parameter set by a Mobile Station(MS). A first switching request is transmitted to a Base Station (BS) in order to switch the parameter sets. A second switching request is transmitted as an explicit switching request along with scheduling interval synchronization information to the BS if the sending of the first switching request has failed. A starting frame number is determined for grants corresponding to parameters of the secondary QoS parameter set upon receiving the retransmitted switching request from the MS. The grants are transmitted from the determined starting frame number to the MS, and the grants are received from the BS.

20 Claims, 5 Drawing Sheets

METHOD AND SYSTEM SWITCHING AND SYNCHRONIZING GRANT INTERVALS IN ADAPTIVE GRANT AND POLLING SERVICE

CROSS-REFERENCE TO RELATED APPLICATION(S)

The present application claims the benefit under 35 U.S.C. §119(a) of an Indian patent application filed on Sep. 24, 2012 in the Indian Intellectual Property Office and assigned Serial No. 3964/CHE/2012, the entire disclosure of which is hereby incorporated by reference.

TECHNICAL FIELD

The present disclosure relates to mobile communication technology. More particularly, the present disclosure relates to switching and synchronizing grant intervals of traffic connection which uses an adaptive grant and polling service for scheduling resources of Voice over Internet Protocol (VoIP) traffic between active and silence intervals in mobile communication.

BACKGROUND

The latest developments in technology have enabled telecommunication services to achieve a breakthrough so as to be widely available to large numbers of users. Further, it is becoming more important to provide telecommunication services to fixed and mobile subscribers as efficiently and inexpensively as possible. Further, the usage of mobile applications results in an increasing need for wireless networks that are capable of delivering large amounts of data at high speed. Development of more efficient and higher bandwidth wireless networks has become increasingly important.

The 802.16 family of standards have been developed by the Institute of Electrical and Electronic Engineers (IEEE) to provide for fixed, portable, and mobile Broadband Wireless Access (BWA) networks. The Worldwide Interoperability for Microwave Access (WiMAX) forum facilitates the deployment of broadband wireless networks based on the IEEE 802.16 standard. In particular, the WiMAX forum ensures the compatibility and inter-operability of broadband wireless equipment. A broadband wireless network may be based on various standards, such as an IEEE 802.16e based WiMAX standard, and its evolution to IEEE 802.16m standard, which provide various types of services such as voice, packet data, and other similar services.

In the broadband wireless network, application packets are transmitted using a logical connection between a Mobile Station (MS) and a Base Station (BS). Each logical connection is associated with a scheduling service. The scheduling service defines the method by which the MS may request and get a grant from the BS for transmitting the application packets. Several scheduling services are defined to cater to the different Quality of Service (QoS) requirements of various applications. In the broadband wireless network based on IEEE 802.16m, Adaptive Grant and Polling Service (AGPS) is defined as a scheduling service for efficient operation and to provide QoS to the various applications. In AGPS two sets of QoS parameters are defined, those being a primary QoS parameter set and a secondary QoS parameter set. A Grant and Poling Interval (GPI) may be defined for each parameter set, such that a GPI_primary and a GPI_secondary define a grant interval, respectively, in the primary and secondary QoS parameter set. A Grant_Size_primary and a Grant_Size_secondary define a grant size, respectively, in the primary and secondary QoS parameter set.

Further, two methods of switching between the primary QoS parameter set and the secondary QoS parameter set may be defined. In a first method, the BS switches between the primary QoS parameter set and the secondary QoS parameter set based on a traffic pattern, and the first method may be referred to as implicit switching. In a second method, a switching request is sent by the MS to the BS to switch between the primary QoS parameter set and the secondary QoS parameter. One of the first and second methods selected according to a negotiation between the MS and BS at the time of service or logical connection creation.

The first and second methods for switching between the primary QoS parameter set and the secondary QoS parameter set rely on the successful transmission of the switching request or packet corresponding to the changed traffic pattern. In a case of a VOIP connection using AGPS service, if a silence VoIP packet sent by the MS is not received at the BS, then BS assumes that MS is in an active mode and continues to allocate the resources for the MS based on a QoS parameter set corresponding to the active mode. In such a case, even though the MS has switched to a silence mode of operation, the BS continuously allocates the resources based on the QoS parameter set corresponding to the active mode which may lead to a wastage of resources and a switching delay. The allocation of the grant after switching and actual transmission time of packets is also not synchronized because of switching delay. In the light of above discussion, it is evident that the existing methods for switching between the primary QoS parameter set and the secondary QoS parameter set is not efficient. Hence, there is a need for method that synchronizes grant allocation and packet transmission time and also reduces the wastage of resources and switching delays, while switching from the primary QoS parameter set and the secondary QoS parameter set.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure provide a method and system that provides grant interval synchronization for efficient switching between a primary Quality of Service (QoS) parameter set and a secondary QoS parameter set.

Aspects of the present disclosure provide a method for grant interval synchronization using remaining switching period information.

Aspects of the present disclosure provide a hybrid method of sending a first switching request using implicit switching and resending the switching request in a switching period using explicit switching.

According to an aspect of the present disclosure, a method for switching and synchronizing parameters of adaptive granting and polling service in a wireless network is provided. The method includes determining a switching of parameter sets from a primary QoS parameter set to a secondary QoS parameter set by a Mobile Station (MS), the secondary QoS parameter set having a scheduling interval that is longer than a scheduling interval of the primary QoS parameter set, transmitting a switching request to a Base Station (BS) after the determining of the switching of the parameter sets in order to initiate the switching of the parameter sets, the first switching request being at least one of an implicit switching request and an explicit switching request, transmitting a second switching request as the explicit switching request along with scheduling interval synchronization information to the BS if the sending of the first switching request has failed, determining, by the BS, a starting frame number for grants corresponding to parameters of the secondary QoS parameter set upon receiving the second switching request from the MS, transmitting, by the BS, the grants corresponding to the parameters of the secondary QoS parameter set from the determined starting frame number to the MS and receiving, by the MS, the grants corresponding to the parameters of the secondary QoS parameter set from the BS.

Another aspect of the present disclosure is to provide a MS for switching and synchronizing parameters of adaptive granting and polling service in a wireless network. The MS includes an integrated circuit including at least one processor, and at least one memory storing a computer program code that is executable by the integrated circuit, wherein the computer program code is configured to determine a switching of parameter sets from a primary QoS parameter set to a secondary QoS parameter set, the secondary QoS parameter set having a scheduling interval that is longer than a scheduling interval of the primary QoS parameter set, transmitting a first switching request to a BS after determining the switching of the parameter sets in order to initiate the switching of the parameter sets, the first switching request being at least one of an implicit switching request and an explicit switching request, transmitting a second switching request as the explicit switching request along with scheduling interval synchronization information to the BS if the sending of the first switching request has failed and receive grants corresponding to parameters of the secondary QoS parameter set.

Another aspect of the present disclosure is to provide a BS for switching and synchronizing parameters of adaptive granting and polling service to a MS in a wireless network. The BS includes an integrated circuit including at least one processor, and at least one memory storing a computer program code that is executable by the integrated circuit, wherein the computer program code is configured to determine a starting frame number for grants corresponding to parameters of a secondary QoS parameter set upon the BS receiving a switching request from the MS and transmit grants to the MS based on the determined starting frame number.

Other aspects, advantages, and salient features of the present disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein provide a method and system for grant interval synchronization for efficient switching between a primary Quality of Service (QoS) parameter set and a secondary QoS parameter set. A Mobile Station (MS) determines remaining switching period information, which is sent, along with a switching request, to the Base Station (BS). The embodiments of the method provide a hybrid method of implicit and explicit switching by sending a first switching request using implicit switching and resending the switching request in a switching period using explicit switching, thus reducing an overhead for sending the first switching request.

Further, the embodiments of the method reduce a switching delay and wastage of resources that are allocated by the BS to the MS. The MS may resend the switching request after a certain delay, for example a delay corresponding to a Grant and Poling Interval (GPI) GPI_primary. The embodiments of the method use grants allocated by the BS based on a grant size at a grant interval of a primary QoS, defined in an Adaptive Grant Polling Service (AGPS), in a switching period for resending the switching request. The embodiments of the method reduce the overhead by resending the switching request.

Throughout the description of the embodiments of the present disclosure, the term normal mode and active mode are used interchangeably.

Figure 1:
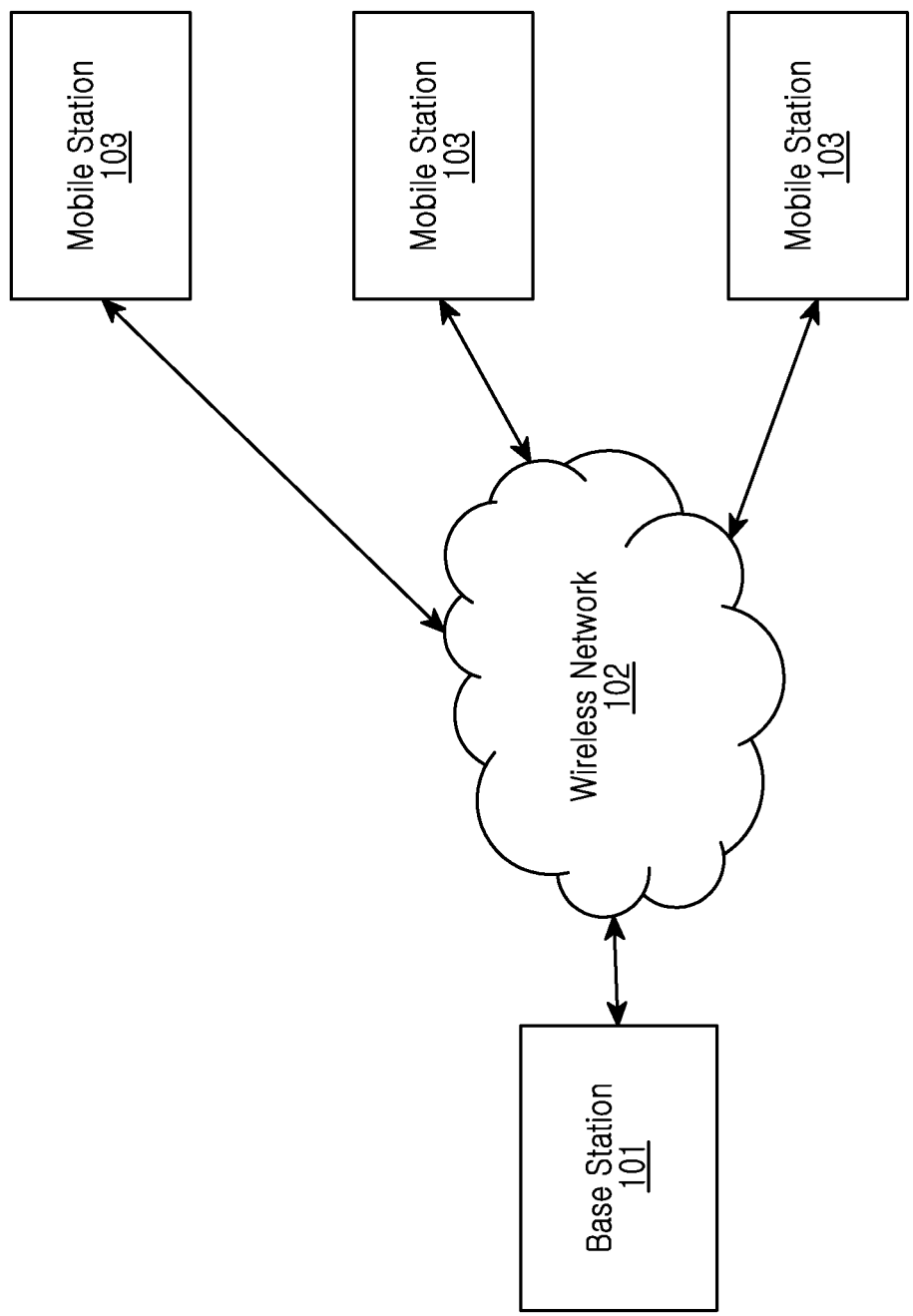
FIG. 1 illustrates a wireless network operating environment according to various embodiments of the present disclosure.

FIG. 1 illustrates a wireless network operating environment, according to various embodiments of the present disclosure.

Referring to FIG. 1, the wireless network operating environment includes a BS 101, a wireless network 102 and at least one MS 103. The MS 103 is connected to the BS 101 through the wireless network 102. In an embodiment, there may be a plurality of MSs 103 that are connected to the BS 101 through the wireless network 102. The BS 101 allocates resources to the MS 103 for carrying application packets from the MS 103 in an uplink direction. Further, the MS 103 may transmit the application packets based on the resources allocated by the BS 101. The BS 101 allocates resources to the MS 103 based on a request sent by the MS 103. The MS 103 sends a request to the BS 101 for obtaining the resources. The MS 103 obtains the resources in the form of grants from the BS 101 by sending the request.

For certain applications, such as Voice Over Internet Protocol (VoIP), where the packets are delivered from the MS 103 at a fixed interval and the packets are of a fixed size, the BS 101 allocates the resources to the MS 103 without receiving the request from the MS 103. For other applications, where the traffic pattern is not of the fixed size, for example, in a case wherein, for certain interval the packet size is 'x', and for another interval the packet size is 'y', an Adaptive Grant Polling Service (AGPS) may be used. The AGPS allows two different kinds of traffic patterns. For identifying the two different kinds of traffic patterns, two sets of Quality of Service (QoS) parameters are defined in the AGPS. The two different traffic patterns in AGPS are identified by using parameters, those being a grant size and a grant interval.

The two sets of QoS parameters defined in AGPS include a primary QoS parameter set and a secondary QoS parameter set. Each set of QoS parameters includes a grant size and a grant interval. The GPI_primary and a GPI_secondary respectively define the grant interval in the primary and secondary QoS parameter sets. A Grant_Size_primary and a Grant_Size_secondary respectively define the grant size in the primary and secondary QoS parameter sets. Further, two methods of switching between the primary QoS parameter set and secondary QoS parameter set are defined in AGPS. In a first method, the BS 101 switches between the primary QoS parameter set and secondary QoS parameter set based on the traffic pattern, and the first method may be referred to as implicit switching. In a second method, a switching request is sent by the MS 103 to the BS 101 to switch between the primary QoS parameter set and secondary QoS parameter set, and the second method may be referred to as explicit switching. Use of the first method or the second method is negotiated between the MS 103 and BS 101 at the time of service or logical connection creation.

For example, in a case wherein a VoIP service has two traffic patterns, one traffic pattern corresponding to a silence mode of operation, such that the traffic pattern follows the secondary QoS parameter set, and another traffic pattern corresponding to the active mode of operation, such that the traffic pattern follows primary QoS parameter set. In the active mode of operation, active VoIP packets are transmitted by the MS 103 every 20 milliseconds (ms). However, the present disclosure is not limited thereto, and the active VoIP packets may be transmitted by the MS every 'x' ms, wherein 'x' is determined based on codec used or the active VoIP packets may be transmitted at any suitable and/or similar interval. In the silence mode of operation, a silence VoIP packet is transmitted every 160 ms. However, the present disclosure is not limited thereto, and the silence VoIP packets may be transmitted by the MS every 'y' ms, wherein 'y' is determined based on codec used or the active VoIP packets may be transmitted at any suitable and/or similar interval. So, for the case of the VoIP service using AGPS, QoS parameters are negotiated.

In an embodiment, in the active mode of operation, the BS 101 allocates resources to the MS 103 every 20 milliseconds. The resources are allocated such that they are large enough to carry active VoIP packets from the MS 103. Further, in a silence mode of operation, the BS 101 allocates resources to the mobile station MS 103 every 160 milliseconds and the allocated resources are large enough to carry silence VoIP packets from the MS 103.

Figure 2:
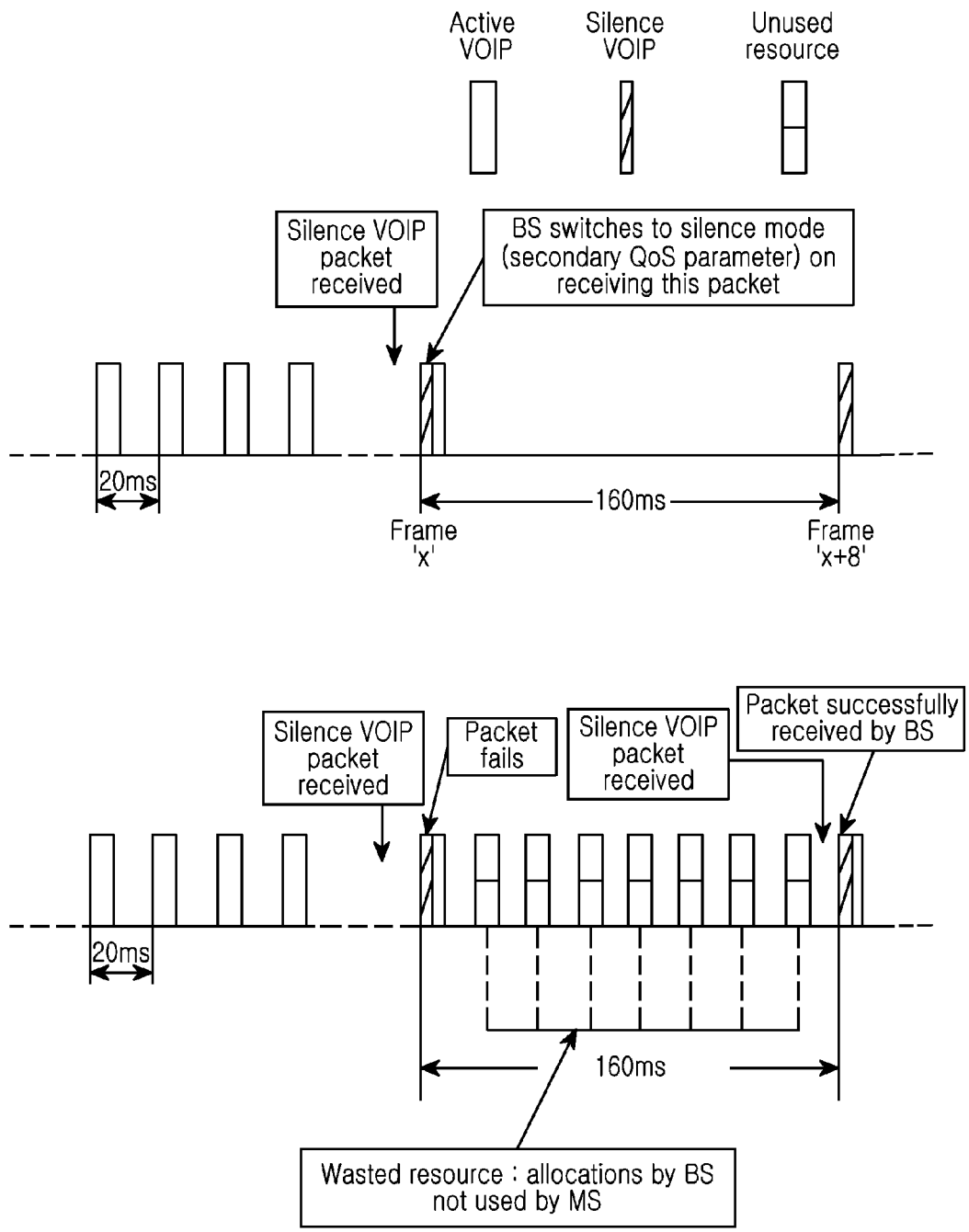
FIG. 2 illustrates a method of switching from a normal mode to a silence mode using implicit switching according to an embodiment of the present disclosure.

FIG. 2 illustrates a method of switching from a normal mode to a silence mode using implicit switching according to an embodiment of the present disclosure.

Referring to FIG. 2, in implicit switching, the BS 101 switches to the silence mode from the active mode of operation after receiving a silence VoIP packet from the MS 103. Initially, the MS 103 is in the active mode of operation. In the active mode of operation, the MS 103 transmits the active VoIP packets every 20 ms. When the MS 103 detects a silence VoIP packet during the active mode of operation, then the MS 103 sends a silence VoIP packet to the BS 101. Under certain instances, due to channel conditions, the silence VoIP packet transmitted by the MS 103 may fail. In such cases, the BS 101 is not able to know the change of traffic pattern at the MS 103, and the BS 101 may grants resources to the MS 103 as though the MS 103 is in the active mode of operation. This leads to the wastage of resources allocated by the BS 101. Further, the MS 103 may send the silence VoIP packet every 160 ms to the BS 101. In the similar way, if 'n' consecutive silence VoIP packets are lost, there is a wastage of (160*n/20)−1 allocations of resources by the BS 101.

Figure 3:
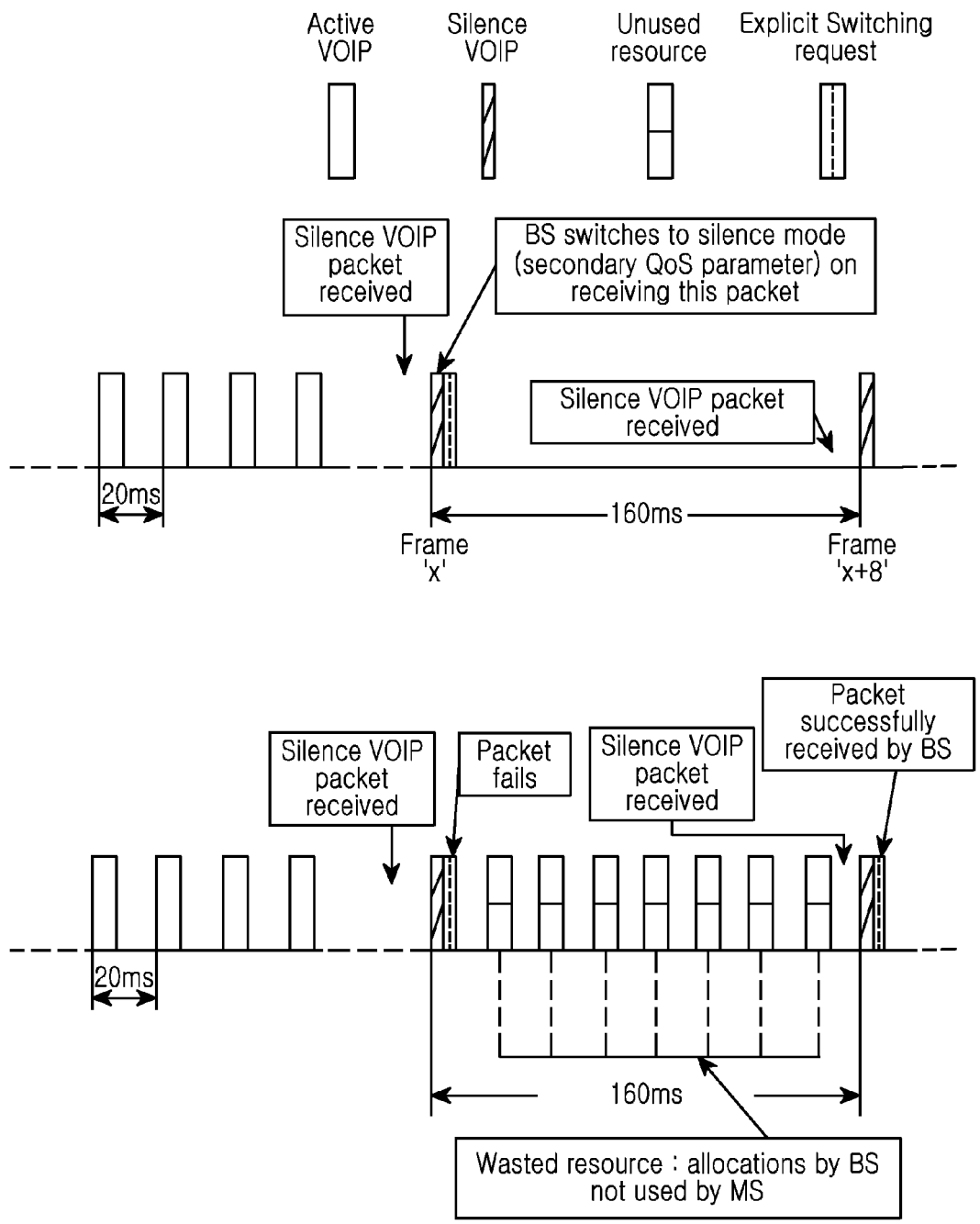
FIG. 3 illustrates a method of switching from a normal mode to a silence mode using explicit switching according to an embodiment of the present disclosure.

FIG. 3 illustrates a method of switching from a normal mode to a silence mode using explicit switching according to an embodiment of the present disclosure.

Referring to FIG. 3, in an explicit switching method, the MS 103 sends an explicit switching request together with the silence VoIP packet. Initially, the MS 103 is in the active mode of operation. In the active mode of operation, the MS 103 transmits the active VoIP packets every 20 ms. When the MS 103 detects a silence VoIP packet during the active mode of operation, then the MS 103 sends a silence VoIP packet along with an explicit switching request to the BS 101. The BS 101 uses a frame in which the explicit switching request is received as a reference for a start of a grant interval after switching.

The BS 101 switches to the silence mode after receiving the explicit switching request. The BS 101 allocates resources every 160 ms, the resources being of a size large enough to carry the silence VoIP packet, starting from a frame 'x+8', wherein each frame has a size of 20 ms. Under certain instances, due to channel conditions, the silence VoIP packet along with the explicit switching request, as transmitted by the MS 103, may fail. In such cases, the BS 101 may not know the change of traffic pattern at the MS 103 and may grant resources to the MS 103 as though the MS 103 is in the active mode of operation. This leads to the wastage of resources allocated by the BS 101. Further, the MS 103 may retransmit the silence VoIP packet every 160 ms to the BS 101. In a similar way, if 'n' consecutive explicit switching requests are lost, there is a wastage of (160*n/20)−1 allocations of resources which delays the switching of the BS 101 by (160*n)ms.

Figure 4:
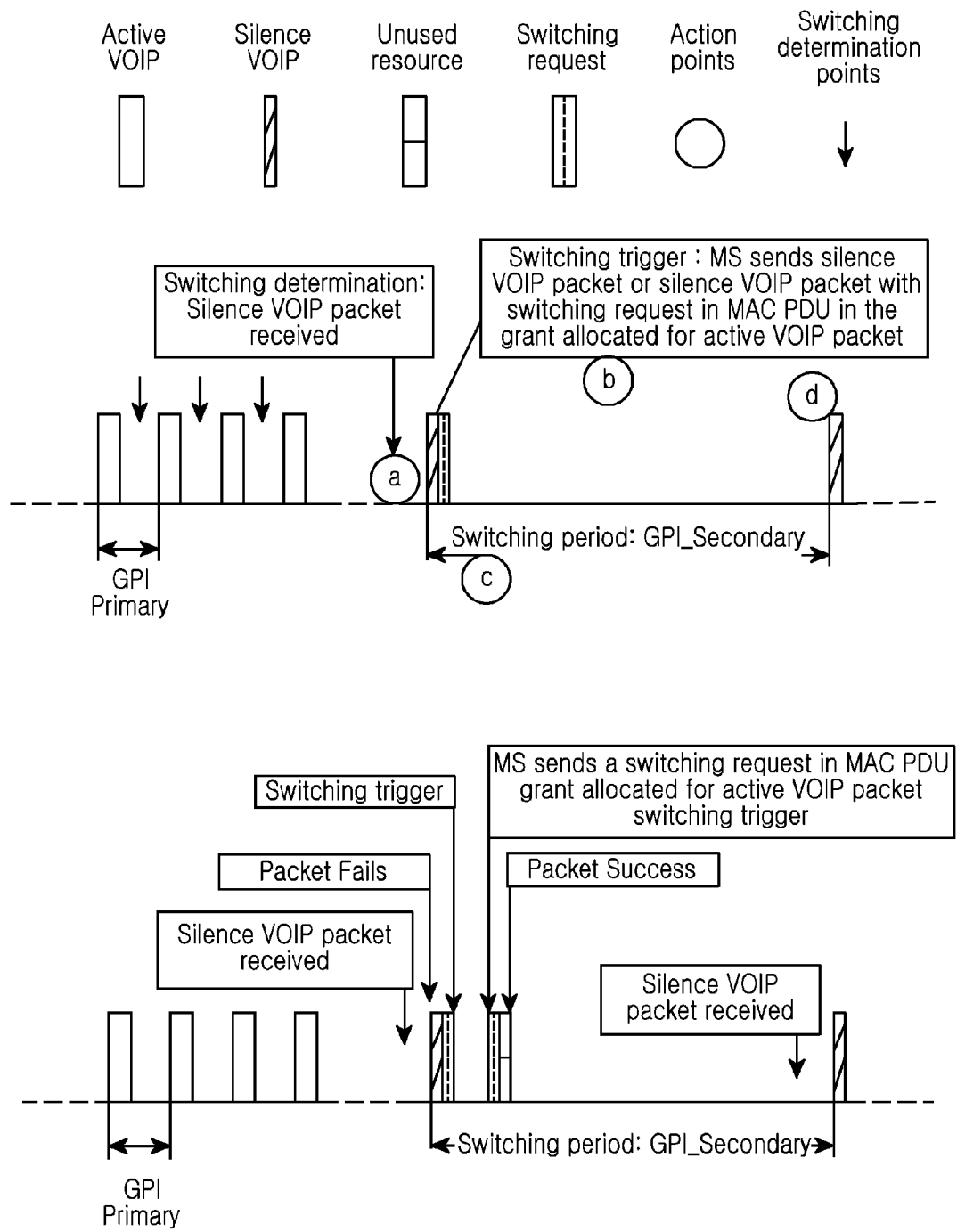
FIG. 4 illustrates a method of switching from a normal mode to a silence mode according to various embodiments of the present disclosure.

FIG. 4 illustrates a method of switching from a normal mode to a silence mode according to various embodiments of the present disclosure.

Referring to FIG. 4, initially, the MS 103 is in the active mode of operation. In the active mode of operation, the BS 101 grants resources to the MS 103, wherein an amount of the granted resources equals the Grant_Size_Primary and the granted resources are granted at a grant interval of GPI_Primary. The MS 103 transmits an active VoIP packet to the BS 101 at every interval corresponding to GPI_Primary, which may be at every 20 ms. The method of switching from the active mode of operation to the silence mode of operation is explained herein below.

In the active mode of mode of operation, the MS 103 transmits active VoIP packets every 20 ms to the BS 101. As depicted in FIG. 4, the GPI_Primary denotes the time interval of 20 ms for which the MS 103 transmits an active VoIP packet to the BS 103. Initially, the MS 103 determines the switching from the active mode to the silence mode of operation. The switching determination is shown in FIG. 4 with an action point 'a'. The MS 103 determines the type of VoIP packet received from upper layers. In an embodiment, a Media Access Control (MAC) layer at the MS 103 determines the type of VoIP packet received from upper layers. The VoIP packet may be either an active VoIP packet or a silence VoIP packet. In an embodiment, the MAC layer uses a VoIP packet header or a VoIP packet size to determine the type of VoIP packet. The reception of the silence VoIP packet in the active mode of operation triggers the switching from the active mode of operation to the silence mode of operation.

Then the method of FIG. 4 initiates the switching trigger when a need for switching is determined at the action point 'a'. The initiating of the switching trigger is shown with an action point 'b' in FIG. 4. The method of FIG. 4 determines a type of switching, from among the implicit switching and the explicit switching, that has been enabled for the VoIP. If it is determined that the implicit switching is enabled for the VoIP, then the MAC layer at the MS 103 transmits a MAC Protocol Data Unit (PDU) to the BS 101 along with the silence VoIP packet in the next allocation after the determination of the switching type. Further, if the explicit switching is enabled for the VoIP, then the MAC layer at the MS 103 transmits a MAC PDU along with the silence VoIP packet and a switching request in the next allocation after the determination of the switching type.

Further, after transmitting the MAC PDU with the silence VoIP packet and the switching request by the MS 103, the method of FIG. 4 initiates switching period processing during a switching period. The MS 103 follows sequential operations, as described herein, in the switching period. The switching period starts from the frame in which the switching request is first initiated. The switching period is shown in FIG. 4 with an action point 'c'. The switching period denotes the interval after which new grants should start from the BS 101 with a new grant interval.

In the switching period, the MS 103 determines whether the switching request is successfully received by the BS 103. The MS 101 determines that the switching is not successful if it receives a grant equal to the Grant_Size_Primary at a grant interval of the GPI_Primary in the switching period. The action point 'd' in FIG. 4 denotes that the switching request is successfully received by the BS 101.

The MS 103 sends the MAC PDU with the switching request in the received grant equal to 'Grant_Size_Primary' at a grant interval of 'GPI_Primary' in the switching period. Further, the MS 103 sends a parameter 'Scheduling Interval Synchronization Info' along with the switching request. The 'Scheduling Interval Synchronization Info' is used by the BS 101 to determine the start of the grant interval for sending the 'Grant_Size_secondary'.

In order to achieve the grant interval synchronization, the BS 101 should know the start frame of the silence VoIP packet transmitted by the MS 103. Once the MS 103 determines that the switching request is not successful, then the MS 103 sends the MAC PDU to BS 101 with the switching request in the received grant interval equal to the 'Grant_Size_Primary' at the grant interval of the 'GPI_Primary' in the switching period. Further, the MS 103 sends the parameter 'Scheduling Interval Synchronization Info' along with the switching request. The 'Scheduling Interval Synchronization Info' is used by the BS 101 to determine the start of the grant interval for sending the 'Grant_Size_secondary'.

According to an embodiment, the 'Scheduling Interval Synchronization Info' may be sent to the BS 101 in different ways as described herein. For example, the MS 103 sets the 'Scheduling Interval Synchronization Info' to an 'Elapsed time' in the switching request. The 'Elapsed time' represents a number of grants, based on the 'GPI_Primary', that are already elapsed since the beginning of the switching period. The 'Scheduling Interval Synchronization Info', which may also be referred to as 'Scheduling Interval Info', is set to the 'Elapsed time' as shown in Equation (1).

Equation (1)

$$\text{Scheduling IntervalInfo} = \begin{cases} ElapsedTime & \text{if Switching\_Period} == \text{GPI\_Secondary} \\ ElapsedTime \bmod \left( \frac{\text{GPI\_Secondary}}{\text{GPI\_Primary}} \right) & \text{if Switching\_Period} > \text{GPI\_Secondary} \end{cases}$$

Further, when the BS 101 receives the switching request with the 'Scheduling Interval Synchronization Info', the BS 101 immediately stops transmitting the grants based on the 'Grant_Size_Primary' and the 'GPI_Primary'. The BS 101 sends the grants to the MS 103 based on the 'Grant_Size_Secondary' and the 'GPI_Secondary' for the silence mode of operation from the 'StartFrameNumber' corresponding to 'n' equals 0. The 'StartFrameNumber' is determined according to Equation (2), as shown below. The 'StartFrameNumber' corresponding to 'n'>0 indicates subsequent frame numbers at which the BS 101 sends the grants to the MS 103 based on the 'Grant_Size_Secondary' and the 'GPI_Secondary' for the silence mode of operation.

Equation (2)

$$StartFrameNumber = \begin{Bmatrix} n*\text{GPI\_Secondary} + \left(SwitchingrequestFrame + \left(\frac{\text{GPI\_Secondary}}{\text{GPI\_Primary}}\right) - SchedulingIntervalInfo\right) \\ \text{where '}n\text{' equals } 0, 1, 2, \ldots \end{Bmatrix}$$

In an embodiment, in order to achieve the grant interval synchronization, the MS 103 sets the 'Scheduling Interval Synchronization Info', which is also known as the 'Scheduling Interval Info', to a value corresponding to '(GPI_Secondary/GPI_Primary)–Elapsed Time' along with switching request as shown in Equation (3).

'GPI_Secondary' for the silence mode of operation from the 'StartFrameNumber', as shown in Equation (2).

In an embodiment, the MS 103 sets the 'Scheduling Interval Synchronization Info' to an absolute frame number or a number of intervals based on the 'GPI_primary' after which the BS 101 starts sending the grants based on the Equation (3)

$$SchedulingIntervalInfo = \begin{Bmatrix} \left(\frac{\text{GPI\_Secondary}}{\text{GPI\_Primary}}\right) - ElapsedTime & \text{if Switching\_Period} = \text{GPI\_Secondary} \\ \left(\frac{\text{GPI\_Secondary}}{\text{GPI\_Primary}}\right) - ElapsedTime \bmod \left(\frac{\text{GPI\_Secondary}}{\text{GPI\_Primary}}\right) & \text{if Switching\_Period} > \text{GPI\_Secondary} \end{Bmatrix}$$

The MS 103, upon receiving this switching request, immediately stops transmitting the grants based on the 'Grant_Size_Primary' and the 'GPI_Primary'. The BS 101 starts sending the grants based on the 'Grant_Size_Secondary' and the 'GPI_Secondary' for the silence mode of operation from the 'StartFrameNumber' corresponding to 'n' equals zero, as shown in Equation (4). The 'StartFrameNumber' corresponding to 'n'>0 indicates subsequent frame numbers at which the BS 101 sends the grants to the MS 103 based on the 'Grant_Size_Secondary' and the 'GPI_Secondary' for the silence mode of operation. A 'SwitchingrequestFrame' represents a frame in which the switching request is received.

'Grant_Size_Secondary' and the 'GPI_Secondary' for the silence mode of operation. The MS 103 repeats the method of sending the switching request to the BS 101 until it gets a grants equal to the 'Grant_Size_Secondary' at the 'GPI_Secondary' from the BS 101. Further, the MS 103 receives a grant equal to the 'Grant_Size_Secondary' at the 'GPI_Secondary' upon successfully switching from the normal mode of operation to the silence mode of operation, as shown at action point 'd' in FIG. 4.

Figure 5:
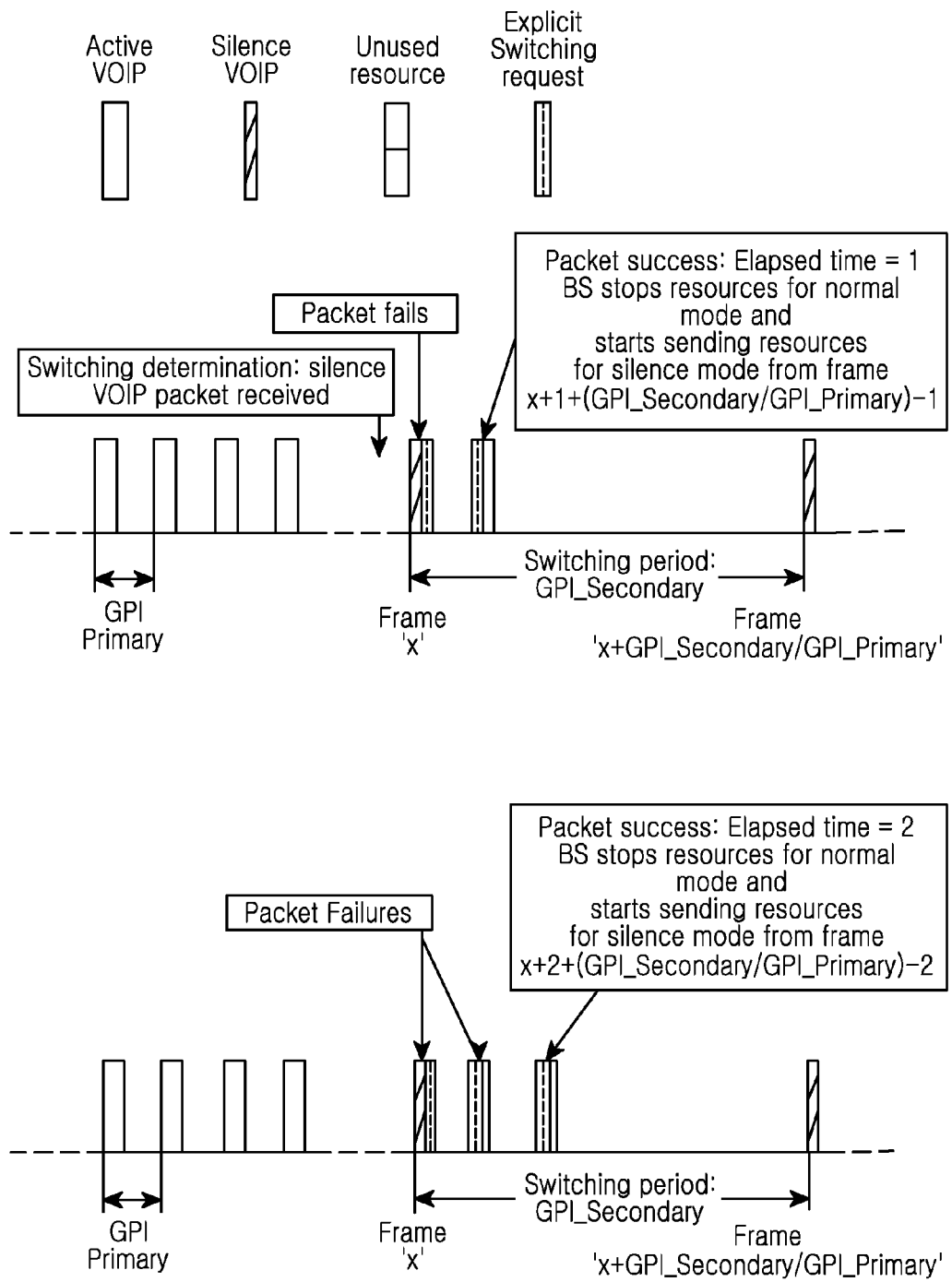
FIG. 5 illustrates a method of grant interval synchronization according to an embodiment of the present disclosure.

FIG. 5 illustrates a method of grant interval synchronization, according to an embodiment of the present disclosure.

Equation (4)

$$StartFrame\ Number = \begin{Bmatrix} n*\text{GPI\_Secondary} + (SwitchingrequestFrame + \text{Scheduling } IntervalInfo) \\ \text{where '}n\text{' equals } 0, 1, 2, \ldots \end{Bmatrix}$$

In an embodiment, the MS 103 sets the 'Scheduling Interval Synchronization Info' to the 'RetransmissionAttempt' of the switching request in the switching period as shown in Equation (5).

Referring to FIG. 5, initially the MS 103 sends the active VoIP packets to the BS 101 at an interval of the 'GPI_Primary' and at a size of the 'Grant_Size_Primary' in the active mode of operation. When a silence VoIP packet is detected Equation (5)

$$SchedulingIntervalInfo = \begin{Bmatrix} RetransmissionAttempt & \text{if Switching\_Period} = \text{GPI\_Secondary} \\ RetransmissionAttempt \bmod \left(\frac{\text{GPI\_Secondary}}{\text{GPI\_Primary}}\right) & \text{if Switching\_Period} > \text{GPI\_Secondary} \end{Bmatrix}$$

The BS 101, upon receiving this switching request, immediately stops transmitting the grants based on the 'Grant_Size_Primary' and the 'GPI_Primary'. The BS 101 starts sending grants based on the 'Grant_Size_Secondary' and the by the MS 103 in the active mode of operation, then the MS 103 determines the switching from the active mode of operation to the silence mode of operation. In order to switch from the active mode of operation to the silence mode of operation, the MS 103 transmits the silence VoIP packet to the BS 101. Once the MS 103 determines the switching, the MS 103 sends the silence VoIP packet, or sends the silence VoIP packet with the switching request, in the MAC PDU in the grant allocated for the active VoIP packet.

Further, the MS 103 determines if the switching request was successful or not. The MS 103 determines that switching is not successful if it receives a grant equal to the 'Grant_Size_Primary' at a grant interval of the 'GPI_Primary' in the switching period. If the switching request is not successful, the MS 103 sends the MAC PDU with the switching request in the received grant equal to the 'Grant_Size_Primary' at a grant interval of the 'GPI_Primary' in the switching period. The MS 103 also sends the parameter 'Scheduling Interval Synchronization Info' along with the switching request, and the 'Scheduling Interval Synchronization Info' is used by the BS 101 to determine the start of the grant interval for sending the 'Grant_Size_secondary'.

As shown in FIG. 5, the MS 103 transmits the silence VoIP packet starting from the frame 'x'. The silence VoIP packet is transmitted to the BS 101 for every 160 ms. The BS 101 switches to the silence mode of operation, according to the secondary QoS parameter set, upon receiving the silence VoIP packet. If the silence VoIP packet transmitted by the MS 103 at frame 'x' has failed, i.e., the silence VoIP packet is not received by the BS 101, then the MS 103 retransmits the silence VoIP packet after 160 ms with frame 'x+1'. The silence VoIP packet is transmitted along with the switching request.

Further, the MS 103 also sends the 'Scheduling Interval Synchronization Info' along with the switching request, wherein the 'Scheduling Interval Synchronization Info' is used by the BS 101 to determine the start of the grant interval for sending the 'Grant_Size_secondary'. In an embodiment, the MS 103 sets the 'Scheduling Interval Synchronization Info' to the 'Elapsed time'. The 'Elapsed time' is set to one, which indicates that the silence VoIP packet transmitted in the frame 'x' is not successfully received by the BS 101.

This retransmitted silence VoIP packet may be received by the BS 101 at the frame 'x+GPI_Secondary/GPI_Primary'. Upon receiving the retransmitted silence VoIP packet, the BS 101 stops allocating resources for the normal mode of operation and starts sending the resources for the silence mode from frame 'x+1+(GPI_Secondary/GPI_Primary)-1'.

Further, if the silence VoIP packet transmitted by the MS 103 fails consecutively for two times, i.e., for two transmission, then MS 103 retransmits the silence VoIP packet after 160 ms with the frame 'x+2'. The silence VoIP packet is transmitted along with the switching request. Subsequently, the MS 103 sends the parameter 'Scheduling Interval Synchronization Info' along with the switching request, wherein the 'Scheduling Interval Synchronization Info' is used by the BS 101 to determine the start of the grant interval for sending the 'Grant_Size_secondary'.

In an embodiment, the MS 103 sets the 'Scheduling Interval Synchronization Info' to the 'Elapsed time', which is set to two so as to indicate that the silence VoIP packet transmitted in the frame 'x' and frame 'x+1' are not successfully received by the BS 101. This retransmitted silence VoIP packet may be received by the BS 101 at the frame 'x+GPI_Secondary/GPI_Primary'. Upon receiving the retransmitted silence VoIP packet, the BS 101 stops allocating resources for the normal mode of operation and starts sending the resources for the silence mode from the frame 'x+1+(GPI_Secondary/GPI_Primary)-2'. In this way, the grant interval synchronization is achieved by sending the 'Scheduling Interval Synchronization Info' along with the switching request.

Further, the BS 101 switches to the silence mode of operation from the active mode of operation upon receiving the switching request along with 'Scheduling Interval Synchronization Information' from the MS 103. Upon receiving this switching request, the BS 101 immediately stops transmitting the grants based on the 'Grant_Size_Primary' and the 'GPI_Primary'. The BS 101 starts sending the grants based on the 'Grant_Size_Secondary' and the 'GPI_Secondary' for the silence mode of operation.

The various embodiments disclosed herein may be implemented through at least one software program running on at least one hardware device and performing network management functions to control the elements used to execute the methods of the various embodiments. The elements shown in FIG. 1 include blocks which may be at least one of a hardware device, or a combination of hardware device and software module. The at least one hardware device may be a processor, a non-transient computer-readable recording medium, an Integrated Circuit (IC), a controller, a Read-Only Memory (ROM), an Erasable Programmable ROM (EPROM), or any other similar and or suitable hardware device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus of a mobile station (MS) for switching and synchronizing parameters of an adaptive granting and polling service (aGPS) in a wireless network, the MS comprising:

at least one processor configured to determine a switching of parameter sets from a primary parameter set to a secondary parameter set, in order to receive a second grant corresponding to the secondary parameter set; and at least one transceiver configured to transmit, to a base station (BS), an initial request failed, if the MS receives a first grant corresponding to the primary parameter set from the BS, wherein the at least one transceiver is further configured to:

in response to determining that the initial request failed, transmit at least one re-request for the switching of the parameter sets with synchronization information to the BS until receiving the second grant from the BS, and receive, from the BS, the second grant at a starting frame transmitted by the BS receiving one of the at least one re-request at a request frame, wherein the starting frame is determined, by the BS, according to the synchronization information and the request frame, and wherein the synchronization information is determined by the MS, according to a number of transmissions of the at least one re-request for the switching of the parameter sets.

2. The apparatus claim 1, wherein the number of the transmissions of the at least one re-request corresponds to a number of receptions of at least one first grant after the transmission of the initial request, and wherein the at least one first grant is transmitted by the BS according to the primary parameter set until receiving one of the at least one re-request.

3. The apparatus of claim 1,
wherein the primary parameter set comprises at least one of a size for the first grant and a first interval for the first grant,
wherein the secondary parameter set comprises at least one of a size for the second grant and a second interval for the second grant,
wherein the primary parameter set corresponds to an active mode for the aGPS,
wherein the secondary parameter set corresponds to a silent mode for the aGPS, and
wherein the starting frame is determined, by the BS, by using the synchronization information, the request frame, the first interval, and the second interval.

4. The apparatus of claim 3,
wherein the synchronization information is determined based on an equation:

$$SchedulingIntervalInfo = \begin{cases} RetransmissionAttempt & \text{if} \quad Switching\_Period == GPI\_Secondary \\ RetransmissionAttempt \bmod \left(\frac{GPI\_Secondary}{GPI\_Primary}\right) & \text{if} \quad Switching\_Period > GPI\_Secondary \end{cases},$$

and
wherein RetransmissionAttempt represents the number of the at least one re-request for the switching of the parameter sets as a frame unit, GPI_Primary represents the first interval as a frame unit, GPI_Secondary represents the second interval as a frame unit, and Switching_Period represents an interval between the staring frame and a frame at which the initial request is transmitted.

5. The apparatus of claim 3,
wherein the starting frame is determined by the BS, based on an equation:

$$StartFrameNumber = \begin{cases} n * GPI\_Secondary + \\ \left(SwitchingrequstFrame + \left(\frac{GPI\_Secondary}{GPI\_Primary}\right) - \right. \\ \left. SchedulingIntervalInfo\right) \\ \text{where } 'n' \text{ equals } 0, 1, 2, \ldots \end{cases},$$

and
wherein StartFrameNumber represents the starting frame, GPI_Primary represents the first interval as a frame unit, GPI_Secondary represents the second interval as a frame unit, and SchedulingIntervalInfo represents the synchronization information as a frame unit.

6. The apparatus of claim 1, wherein the at least one processor is further configured to:
if the MS receives the first grant, determine whether the first grant is received within a switching period between the staring frame and a frame at which the initial request is transmitted, and
if the first grant is received within the switching period, determine that the initial request is failed.

7. An apparatus of a base station (BS) for switching and synchronizing parameters of adaptive granting and polling service (aGPS) provided to a mobile station (MS) in a wireless network, the BS comprising:
at least one transceiver configured to:
transmit, to the MS, a first grant corresponding to a primary parameter set, and
receive, from the MS, a request for a switching of parameter sets from the primary parameter set to a secondary parameter set, with synchronization information at a request frame; and
at least one processor configured to determine a starting frame for a second grant corresponding to the secondary parameter set according to the synchronization information and the request frame,
wherein the at least one transceiver is further configured to transmit, to the MS, the second grant at the determined starting frame,
wherein the synchronization information is determined according to a number of transmissions of at least one re-request for the switching of the parameter sets, the at least one re-request comprising the request, and
wherein the at least one re-request is transmitted after an initial request for the switching of the parameter sets being transmitted until the MS receives the second grant.

8. The apparatus of claim 7,
wherein the primary parameter set corresponds to an active mode for the aGPS,
wherein the secondary parameter set corresponds to a silent mode for the aGPS,
wherein the primary parameter set comprises at least one of a size for the first grant and a first interval for the first grant,
wherein the secondary parameter set comprises at least one of a size for the second grant and a second interval for the second grant, and
wherein the starting frame is determined, by the BS, by using the synchronization information, the request frame, the first interval, and the second interval.

9. The apparatus of claim 8,
wherein determining the starting frame comprises determining the starting frame based on an equation:

$$StartFrameNumber = \begin{cases} n * GPI\_Secondary + \\ \left(SwitchingrequstFrame + \left(\frac{GPI\_Secondary}{GPI\_Primary}\right) - \right. \\ \left. SchedulingIntervalInfo\right) \\ \text{where } 'n' \text{ equals } 0, 1, 2, \ldots \end{cases},$$

and
wherein StartFrameNumber represents the starting frame, GPI_Primary represents the first interval as a frame unit, GPI_Secondary represents the second interval as a frame unit, and SchedulingIntervalInfo represents the synchronization information as a frame unit.

10. The apparatus of claim 7, wherein the interval corresponds to a number of receptions of the first grant by the MS after the first request is transmitted and before the second request is transmitted.

11. A method for operating a mobile station (MS) for switching and synchronizing parameters of an adaptive granting and polling service (aGPS) in a wireless network, the method comprising:
   determining a switching of parameter sets from a primary parameter set to a secondary parameter set, in order to receive a second grant corresponding to the secondary parameter set;
   transmitting, to a base station (BS), an initial request for the switching of the parameter sets;
   if the MS receives a first grant corresponding to the primary parameter set from the BS, determining that the initial request failed;
   in response to determining that the initial request failed, transmitting at least one re-request for the switching of the parameter sets with synchronization information to the BS until receiving the second grant from the BS; and
   receiving, from the BS, the second grant at a starting frame transmitted by the BS receiving one of the at least one re-request at a request frame,
   wherein the starting frame is determined, by the BS, according to the synchronization information and the request frame, and
   wherein the synchronization information is determined, by the MS, according to a number of transmissions of the at least one re-request for the switching of the parameter sets.

12. The method of claim 11,
   wherein the number of the transmissions of the at least one re-request corresponds to a number of receptions of at least one first grant after the transmission of the initial request, and
   wherein the at least one first grant is transmitted by the BS according to the primary parameter set until receiving one of the at least one re-request.

13. The method of claim 11,
   wherein the primary parameter set comprises at least one of a size for the first grant and a first interval for the first grant,
   wherein the secondary parameter set comprises at least one of a size for the second grant and a second interval for the second grant,
   wherein the primary parameter set corresponds to an active mode for the aGPS,
   wherein the secondary parameter set corresponds to a silent mode for the aGPS, and
   wherein the starting frame is determined, by the BS, by using the synchronization information, the request frame, the first interval, and the second interval.

14. The method of claim 13,
   wherein the synchronization information is determined based on an equation:

$$SchedulingIntervalInfo = \begin{cases} RetransmissionAttempt & \text{if} \quad Switching\_Period == GPI\_Secondary \\ RetransmissionAttempt \bmod \left(\frac{GPI\_Secondary}{GPI\_Primary}\right) & \text{if} \quad Switching\_Period > GPI\_Secondary \end{cases},$$

and
   wherein RetransmissionAttempt represents the number of at least one re-request for the switching of the parameter sets as a frame unit, GPI_Primary represents the first interval as a frame unit, GPI_Secondary represents the second interval as a frame unit, and Switching_Period represents an interval between the staring frame and a frame at which the initial request is transmitted.

15. The method of claim 13,
   wherein the starting frame is determined, by the BS, based on an equation:

$$StartFrameNumber = \begin{Bmatrix} n * GPI\_Secondary + \\ \left(SwitchingrequstFrame + \left(\frac{GPI\_Secondary}{GPI\_Primary}\right) - \right. \\ \left. SchedulingIntervalInfo \right) \\ \text{where } 'n' \text{ equals } 0, 1, 2, \ldots \end{Bmatrix},$$

and
   wherein StartFrameNumber represents the starting frame, GPI_Primary represents the first interval as a frame unit, GPI_Secondary represents the second interval as a frame unit, and SchedulingIntervalInfo represents the synchronization information as a frame unit.

16. The method of claim 11, wherein determining that the initial request failed comprises:
   if the MS receives the first grant, determining whether the first grant is received within a switching period between the staring frame and a frame at which the initial request is transmitted; and
   if the first grant is received within the switching period, determining that the initial request is failed.

17. A method for operating a base station (BS) for switching and synchronizing parameters of adaptive granting and polling service (aGPS) provided to a mobile station (MS) in a wireless network, the method comprising:
   transmitting, to the MS, a first grant corresponding to a primary parameter set;
   receiving, from the MS, a request for a switching of parameter sets from the primary parameter set to a secondary parameter set, with synchronization information at a request frame;
   determining a starting frame for a second grant corresponding to the secondary parameter set according to the synchronization information and the request frame; and
   transmitting, to the MS, the second grant at the determined starting frame,
   wherein the synchronization information is determined according to a number of transmissions of at least one re-request for the switching of the parameter sets, the at least one re-request comprising the request, and wherein the at least one re-request is transmitted after an initial request for the switching of the parameter sets being transmitted until the MS receives the second grant.

18. The method of claim 17,
wherein the primary parameter set corresponds to an active mode for the aGPS,
wherein the secondary parameter set corresponds to a silent mode for the aGPS,
wherein the primary parameter set comprises at least one of a size for the first grant and a first interval for the first grant,
wherein the secondary parameter set comprises at least one of a size for the second grant and a second interval for the second grant, and
wherein the starting frame is determined, by the BS, by using the synchronization information, the request frame, the first interval, and the second interval.

19. The method of claim 18,
wherein determining the starting frame comprises determining the starting frame based on an equation:

$$StartFrameNumber = \left\{ \dfrac{ \left( SwitchingrequstFrame + \left( \dfrac{GPI\_Secondary}{GPI\_Primary} \right) \right) n * GPI\_Secondary + - SchedulingIntervalInfo}{} \text{ where } 'n' \text{ equals } 0, 1, 2, \ldots \right\},$$

and
wherein StartFrameNumber represents the starting frame, GPI_Primary represents the first interval as a frame unit, GPI_Secondary represents the second interval as a frame unit, and SchedulingIntervalInforepresents the synchronization information as a frame unit.

20. The method of claim 17, wherein the interval corresponds to a number of receptions of the first grant by the MS after the first request is transmitted and before the second request is transmitted.

* * * * *